(12) United States Patent
Walsh et al.

(10) Patent No.: US 9,154,310 B1
(45) Date of Patent: *Oct. 6, 2015

(54) RESILIENT DEVICE AUTHENTICATION SYSTEM

(71) Applicant: Sypris Electronics, LLC, Tampa, FL (US)

(72) Inventors: John J. Walsh, Lutz, FL (US); Michael J. Duren, Clearwater, FL (US); Hal A. Aldridge, Tampa, FL (US)

(73) Assignee: SYPRIS ELECTRONICS, LLC, Tampa, FL (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/947,071

(22) Filed: Jul. 21, 2013

Related U.S. Application Data

(63) Continuation of application No. 13/552,592, filed on Jul. 18, 2012, now abandoned.

(60) Provisional application No. 61/597,819, filed on Feb. 12, 2012.

(51) Int. Cl.
*H04L 9/32* (2006.01)
*G06F 21/44* (2013.01)
*H04L 9/08* (2006.01)

(52) U.S. Cl.
CPC .............. *H04L 9/3278* (2013.01); *G06F 21/44* (2013.01); *H04L 9/08* (2013.01); *H04L 9/3271* (2013.01)

(58) Field of Classification Search
CPC ..... H04L 9/3278; H04L 2209/12; H04L 9/08; G06F 2221/2129
See application file for complete search history.

(56) References Cited

U.S. PATENT DOCUMENTS

| 7,564,345 | B2 | 7/2009 | Devedas et al. |
| 7,581,248 | B2 | 8/2009 | Atkins et al. |
| 7,681,103 | B2 * | 3/2010 | Devadas et al. ............... 714/752 |
| 7,702,927 | B2 | 4/2010 | Devedas et al. |
| 7,839,278 | B2 | 11/2010 | Devedas et al. |
| 7,926,089 | B2 | 4/2011 | Tulshibagwale et al. |

(Continued)

OTHER PUBLICATIONS

Physically Unclonable Function-Based Security and Privacy in RFID Systems; Leonid Bolotnyy and Gabriel Robins; Proceedings of the Fifth Annual IEEE International; Conference on Pervasive Computing and Communications (PerCom'07); 2007.*

(Continued)

*Primary Examiner* — James Turchen
(74) *Attorney, Agent, or Firm* — Law Office of Thomas J. Brindisi

(57) ABSTRACT

A resilient device authentication system and method comprising: one or more verification authorities (VAs) including a memory loaded with a complete verification set that includes hardware part-specific data, and configured to create a limited verification set (LVS) therefrom; one or more provisioning entities (PEs) each connectable to at least one of the VAs, including a memory loaded with a LVS, and configured to select a subset of data therefrom so as to create an application limited verification set (ALVS). Also disclosed is a device comprising a controller, device memory, input/output capable of communicating with the authentication system, and a physically-unclonable function associated with hardware part-specific information corresponding to hardware part-specific data in the loaded CVS. Further disclosed is an authentication system including hardware security modules.

36 Claims, 8 Drawing Sheets

(56) References Cited

U.S. PATENT DOCUMENTS

| | | | |
|---|---|---|---|
| 7,962,516 | B2 | 6/2011 | Bahrs et al. |
| 8,379,856 | B2 | 2/2013 | Potkonjak |
| 8,458,489 | B2 | 6/2013 | Beckmann et al. |
| 8,463,813 | B2 | 6/2013 | Siress et al. |
| 8,468,186 | B2 | 6/2013 | Yu |
| 8,516,269 | B1 * | 8/2013 | Hamlet et al. ............ 713/189 |
| 8,667,265 | B1 * | 3/2014 | Hamlet et al. ............ 713/150 |
| 2003/0204743 | A1 * | 10/2003 | Devadas et al. ............ 713/200 |
| 2005/0149496 | A1 | 7/2005 | Mukherjee et al. |
| 2005/0222896 | A1 | 10/2005 | Rhyne et al. |
| 2005/0278541 | A1 * | 12/2005 | See et al. ............ 713/182 |
| 2008/0256549 | A1 | 10/2008 | Liu et al. |
| 2008/0256600 | A1 * | 10/2008 | Schrijen et al. ............ 726/2 |
| 2009/0083833 | A1 * | 3/2009 | Ziola et al. ............ 726/2 |
| 2010/0127822 | A1 * | 5/2010 | Devadas ............ 340/5.8 |
| 2010/0250936 | A1 * | 9/2010 | Kusakawa et al. ............ 713/169 |
| 2010/0272255 | A1 | 10/2010 | Devedas et al. |
| 2011/0002461 | A1 * | 1/2011 | Erhart et al. ............ 380/44 |
| 2011/0033041 | A1 | 2/2011 | Yu et al. |
| 2011/0066670 | A1 * | 3/2011 | Yu ............ 708/252 |
| 2011/0215829 | A1 * | 9/2011 | Guajardo Merchan et al. .. 326/8 |
| 2011/0299678 | A1 | 12/2011 | Deas et al. |
| 2012/0072737 | A1 * | 3/2012 | Schrijen et al. ............ 713/189 |
| 2012/0131340 | A1 * | 5/2012 | Teuwen et al. ............ 713/168 |
| 2012/0183135 | A1 * | 7/2012 | Paral et al. ............ 380/44 |
| 2013/0019324 | A1 * | 1/2013 | Tehranipoor et al. ............ 726/34 |
| 2014/0089685 | A1 * | 3/2014 | Suzuki ............ 713/193 |
| 2014/0108786 | A1 * | 4/2014 | Kreft ............ 713/156 |
| 2015/0023495 | A1 * | 1/2015 | Zhang et al. ............ 380/28 |

OTHER PUBLICATIONS

Recombination of Physical Unclonable Functions; Meng-Day (Mandel) Yu and Srinivas Devadas; 35th Annual GOMACTech Conference 2010, Mar. 22-25, 2010, Reno, NV.*

Non-Cryptographic Authentication and Identification in Wireless Networks; Kai Zeng, Kannan Govindan, and Prasant Mohapatra; Oct. 2010.*

Suh, G. 2005. AEGIS: a single-chip secure processor. PhD thesis, Department of Electrical Engineering and Computer Science, Massachusetts Institute of Technology (MIT), 2005.*

Yu, M., and Devadas, S. 2010. Recombination of Physical Unclonable Functions. Government Microcircuit Applications and Critical Technology Conference (GOMACTech), 2010.*

Kirkpatrick et al., PUF ROKs: Generating Read-Once Keys with Physically Unclonable Functions (Extended Abstract), 6th Annual Cyber Security and Information Intelligence Research Workshop, Oak Ridge, TN, Apr. 21-23, 2010, published in Proceedings of the Sixth Annual Workshop on Cyber Security and Information Intelligence Research.

Kirkpatrick et al., PUF ROKs: A Hardware Approach to Read-Once Keys, Proceedings of the 6th ACM Symposium on Information, Computer and Communications Security, ASIACCS 2011, Hong Kong, China, Mar. 22-24, 2011.

Frikken et al., Robust Authentication Using Physically Unclonable Functions, 12th International Conference, ISC 2009, Pisa, Italy, Sep. 7-9, 2009, published in Information Security Lecture Notes in Computer Science, vol. 5735, 2009, pp. 262-277.

* cited by examiner

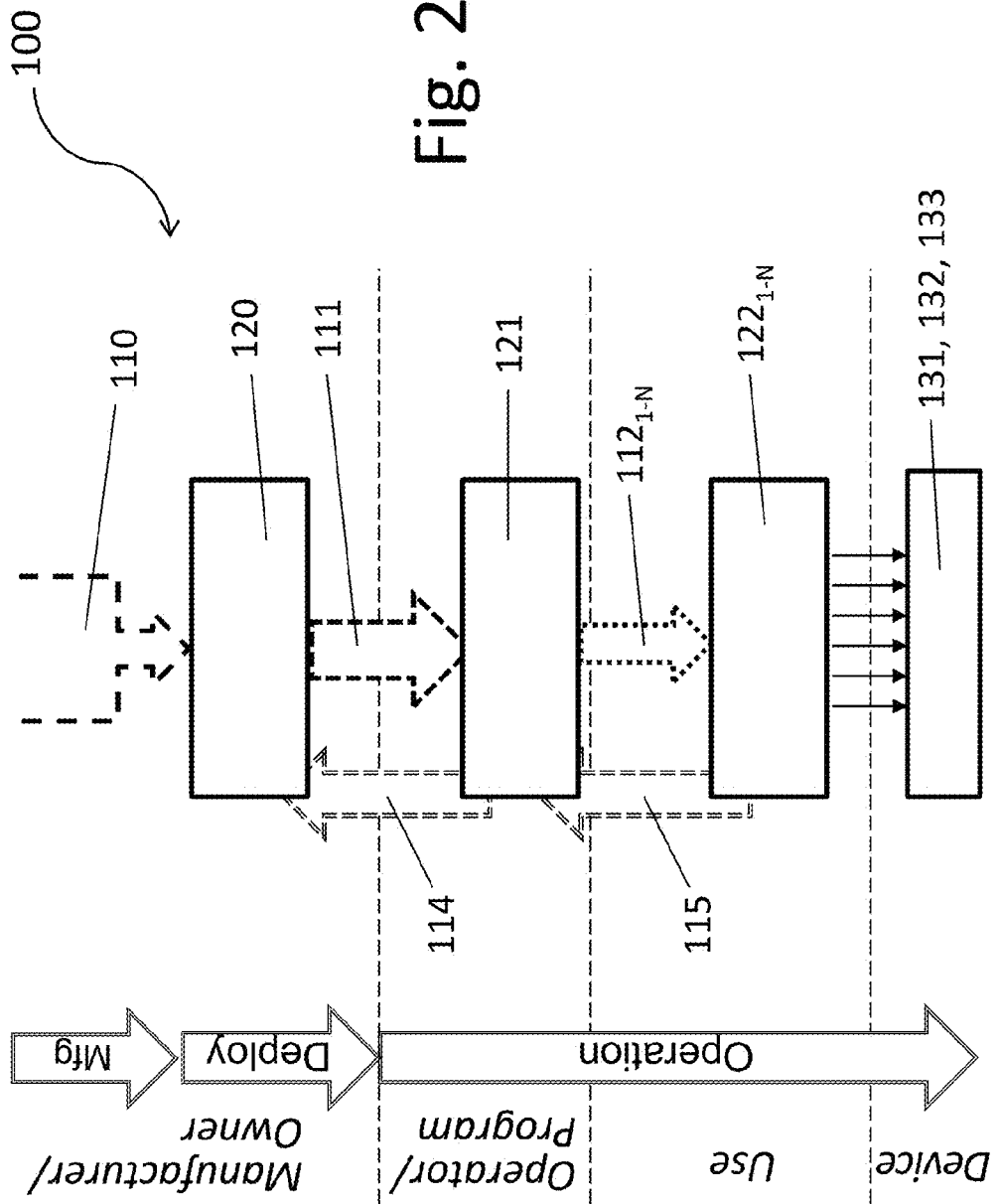

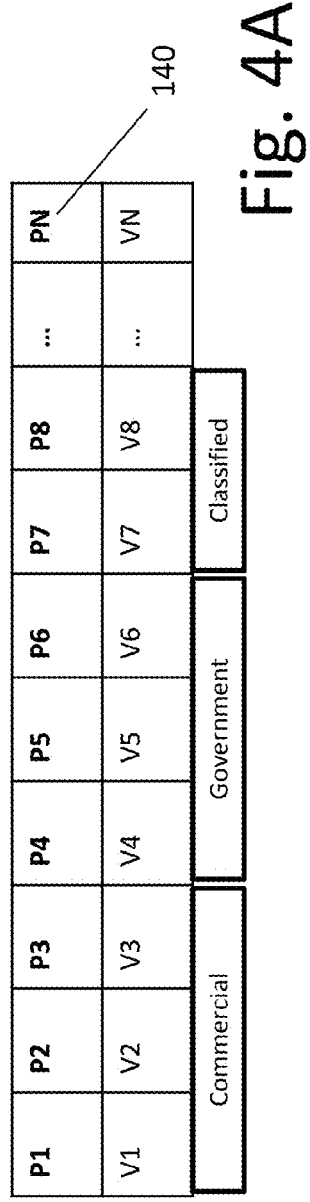
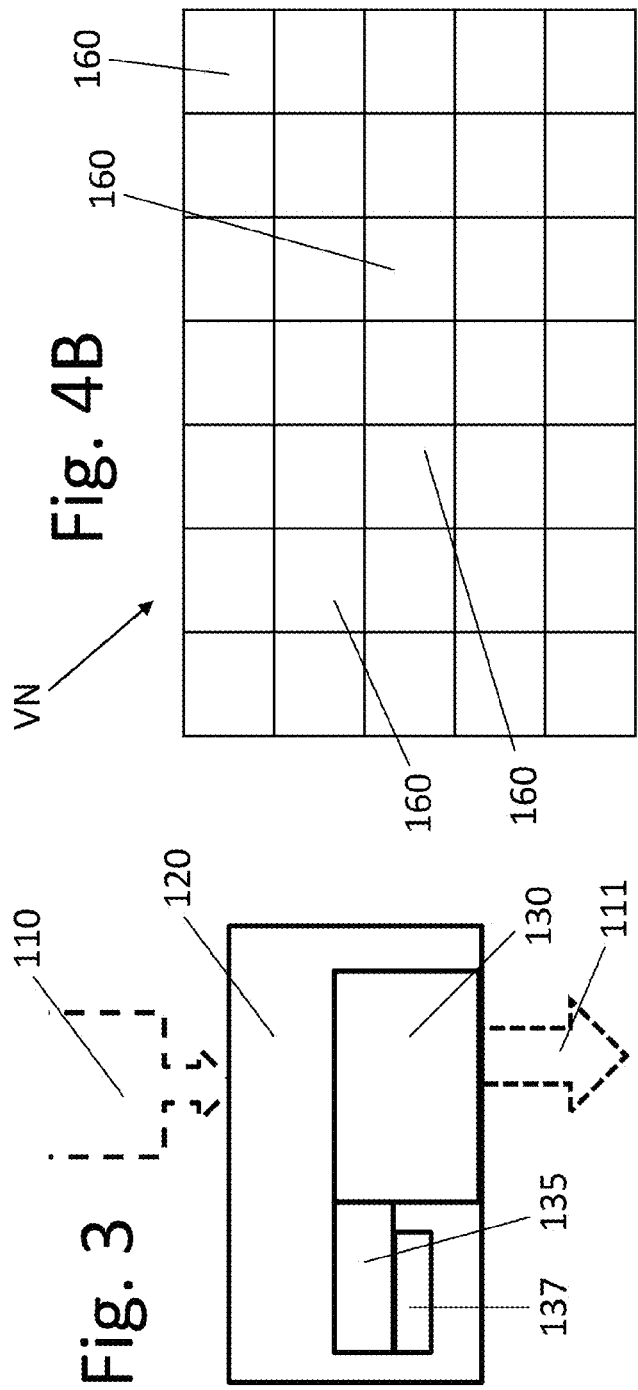

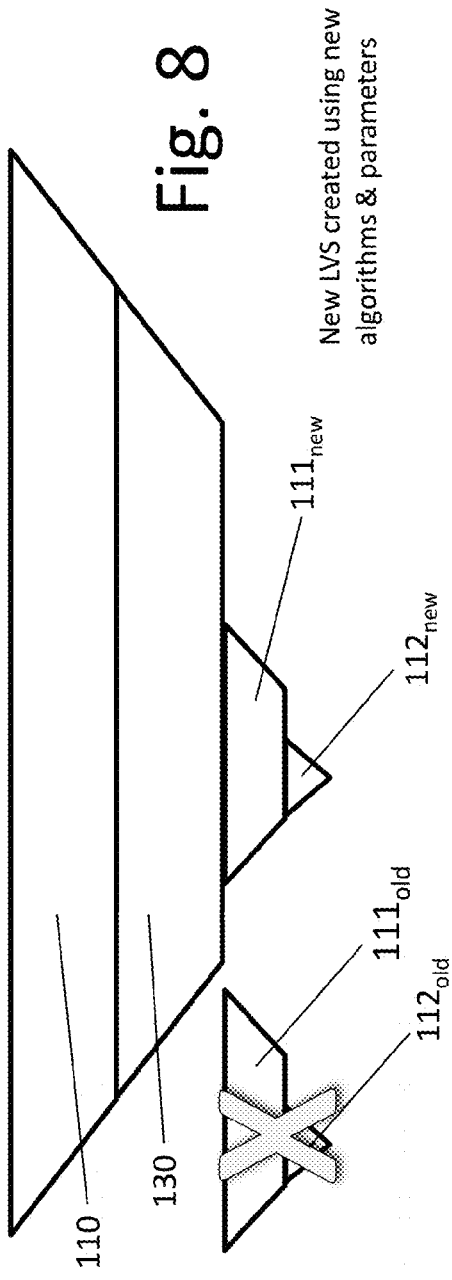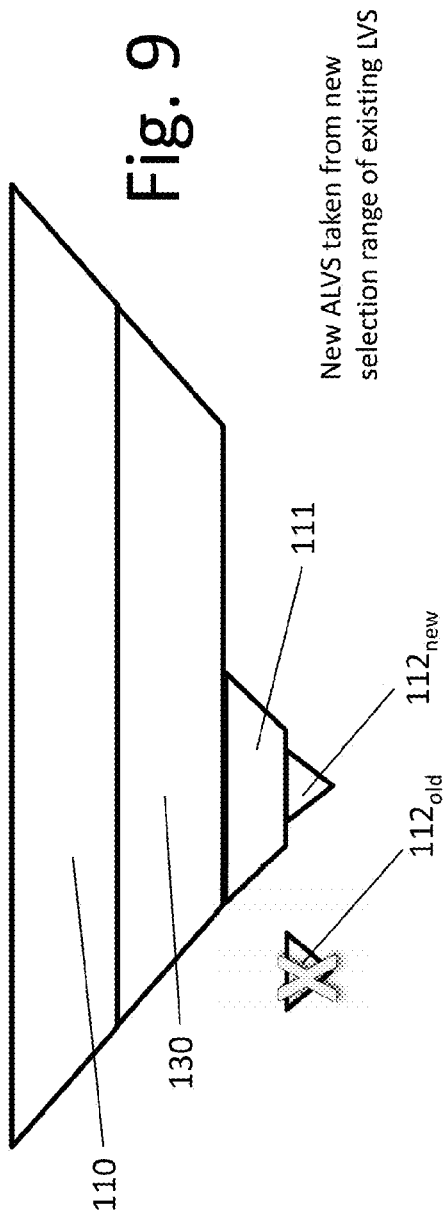

US 9,154,310 B1

RESILIENT DEVICE AUTHENTICATION SYSTEM

RELATED APPLICATIONS

This application is a continuation of U.S. patent application Ser. No. 13/552,592 filed Jul. 18, 2012, and claims the benefit of U.S. provisional patent application Ser. No. 61/597,819 filed Feb. 12, 2012 and entitled "Key Management Utilizing Physically-Unclonable Functions, and Cyber-Physical Security Measures," which is incorporated herein by reference.

BACKGROUND

Managing authentication and identity across systems, users, and enterprises is complex and threat-prone, and increasingly so as endpoints and cloud-based systems continue proliferating. Current solutions for identity management, authentication, and key management are typically disparate in nature and confined in design and purpose to specific applications (e.g., network authentication protocols, PKIs, code-signing, biometrics, etc.). Various methods for deploying identity authentication technologies in contexts such as "smart grids," cloud computing, and enterprise networks and network extensions typically include a variety of applications that would require a number of dissimilar prior art technology solutions, so as to complicate and multiply overall design, planning, and cryptographic-related overhead.

The manufacturing and provisioning costs and burdens associated with establishing "hardware biometrics" (i.e., observable intrinsic features of hardware device material, design, or manufacturing process that can uniquely differentiate a specific device from other devices of the same or similar type) to enable secure device identification, registration, and management are not insignificant. Hitherto, the presumably attendant limitations and ongoing added operating complexity, risk, and overhead would have discouraged attempts to employ hardware biometrics in any types of architectures known to Applicant for managing and authenticating identities across systems, users, and enterprises, as would be required for a manufacturing through end-use approach.

SUMMARY OF THE INVENTION

Applicant has devised a novel system architecture employing hardware biometrics that can avoid the aforementioned ongoing disadvantages, and can outweigh the upfront costs and burdens by virtue of system operating efficiency and reduced costs of trust management and compromise. The present Resilient Device Authentication ("RDA") system enables a holistic development and management of systemic trust mechanisms grounded in physical hardware and extending into the manufacturing process, operating systems, applications, and whole systems, and can be deployed efficiently in a system having a range of diverse applications, throughout the system's lifecycle. Thus hardware-anchored security-related functions that could be performed by applications in various embodiments of an RDA system may include, among many other things, authentication, supply chain security functions, encryption, policy management, data or document certification, key management, etc.

BRIEF DESCRIPTION OF THE DRAWINGS

FIG. 2 depicts an embodiment of a system like that shown in FIG. 1, except that each entity in the lowest level (Distributed Management Systems) universally handles functions that are split between the corresponding entities in the embodiment of FIG. 1, also showing the system's basic divisions according to function or loci.

FIG. 3 depicts part of the system of an embodiment like those of FIGS. 1 and 2, showing further details of the Verification Authority.

FIG. 4A is a representation of a set of 1-N parts (P) having corresponding verification information (V) of different types.

FIG. 4B is a representation of a set of data elements comprising verification information collected for Part N.

FIG. 8 depicts the change or updating of a Limited Verification Set in an embodiment of an RDA system.

FIG. 9 depicts the change or updating of an Application Limited Verification Set in an embodiment of an RDA system.

DETAILED DESCRIPTION OF EMBODIMENTS

The following acronyms are used for basic aspects of the present system:
"CVS" refers to the Complete Verification Set, which is a super-set of hardware-based part-authentication data.
"LVS" refers to a Limited Verification Set, which is a set of data that is derived from part of the CVS.
"ALVS" refers to an Application Limited Verification Set, which is a subset of elements chosen from part of an LVS.
"VA" refers to a Verification Authority, which stores the CVS and creates and distributes LVSs therefrom.
"PE" refers to a Provisioning Entity, which stores an LVS and constructs and distributes ALVSs therefrom.
"DMS" refers to a Device Management System, which stores an ALVS and uses it to authenticate devices (i.e., specific hardware parts) in the system.

Figure 1:
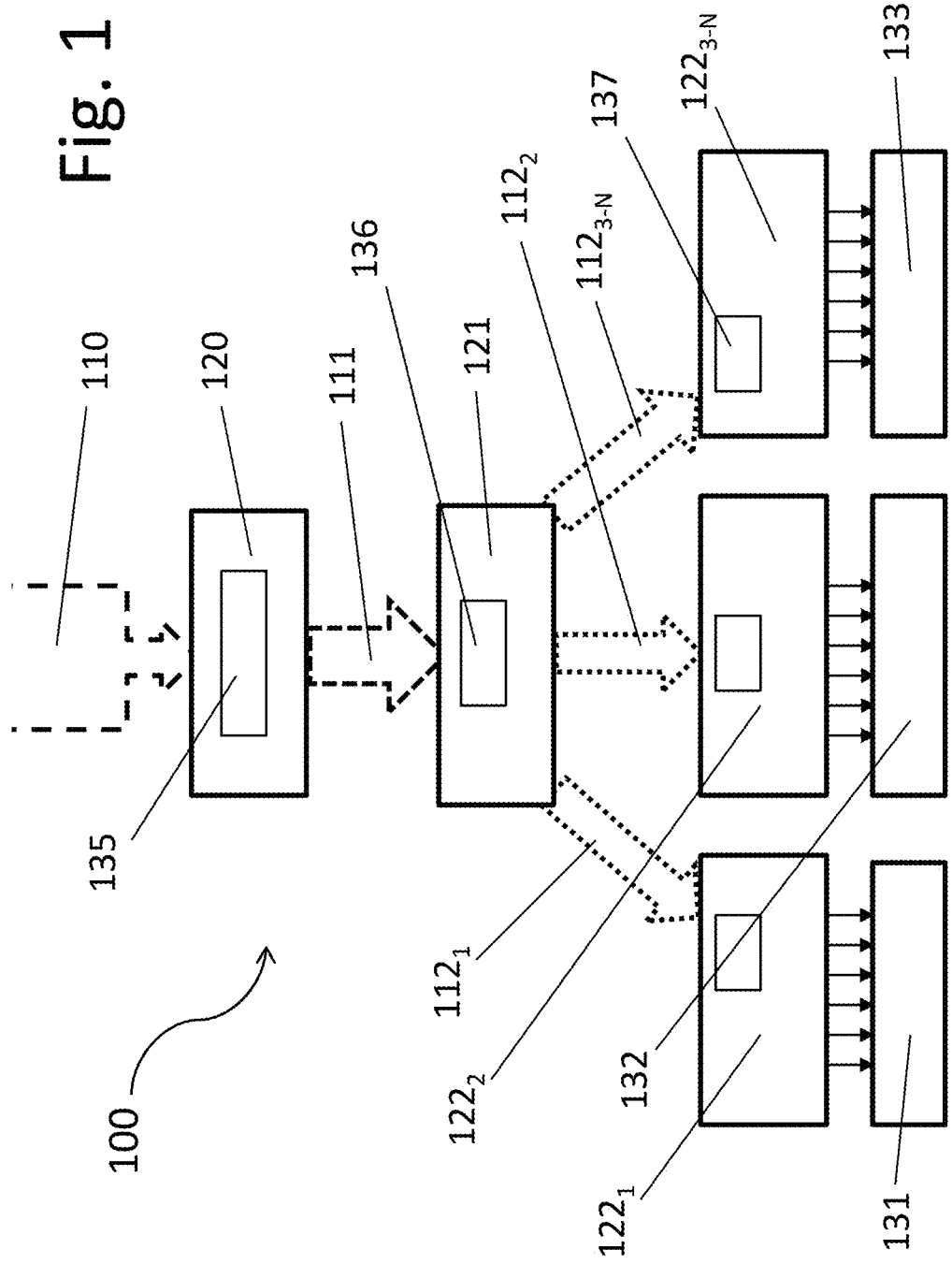
FIG. 1 depicts an embodiment of an RDA system according to the present invention, showing its hierarchical control, flow, and use of device verification information among and by three levels of entities.

Referring to FIGS. 1 and 2, an embodiment of an RDA system 100 according to the present invention can manage authentication-related functions for diverse applications such as supply chain risk management ("SCRM") 131, authentication 132, and other applications 133 (e.g., device management, access management, connectivity management, etc.), using the foundation of a CVS 110 for all hardware verification and authentication functions. The CVS is provided to a VA 120, which distributes an LVS 111 based on the CVS to a PE 121 (or, not shown, the system preferably includes multiple PEs to each of which the VA distributes a different LVS), which in turn provides ALVSs $112_{1-N}$, to DMSs $122_{1-N}$, which then directly interface with the applications.

The CVS is an essentially static database comprising part-specific data elements 160 for all hardware parts 140 (see FIG. 4B) in the system. Preferably each of the elements of the CVS is bound to the unique identity of one specific part, and preferably each part has a plurality of elements bound to it. The database preferably includes significantly disparate types of elements and multiple elements of usefully-unrelated information for each part, so as to permit strong, feature-rich authentication. Such data elements can include (but are not limited to) various parameters, information, validation material, processes, and secrets, etc. such as challenge/response pairs, physical elements that can be remotely interrogated, shared secret information embedded during manufacture, and physical properties that can be used to model a device. CVS elements may be used directly for authentication, may be used as characteristic values for deriving authentication methods tied to a device, and may be sub-divided and allocated such as for a particular use or verification process. Specific elements may contribute different features to the authentication process, for example one being used to identify the physical device while another is a revocable component (e.g., relational information such as a device's registered location). Confidentiality, integrity, assurance, and performance can be managed through the selection of revocable and non-revocable elements to be included in the CVS.

The CVS includes device-level- and preferably chip-level-security data elements based on one or more types of hardware features such as physically-unclonable functions ("PUFs") 150, PUF-derived data, physical features of a design, etc. Such data elements can be formed, derived, revealed, and recorded, and/or tested for presence, robustness, and applicability at the time of manufacture. For example, in the case of a PUF, the loading and characterization of device may occur upon fabrication of an application specific integrated circuit ("ASIC") or initial programming of a field-programmable gate array ("FPGA").

Figure 5:
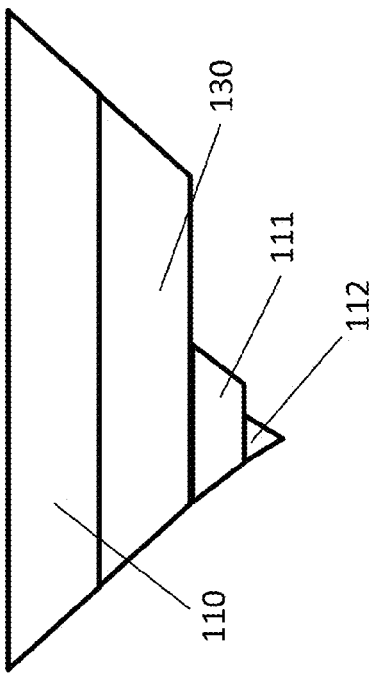
FIG. 5 is a diagram like that of FIG. 3, but with a siloing of Verification Authorities and data by class.
Figure 10:
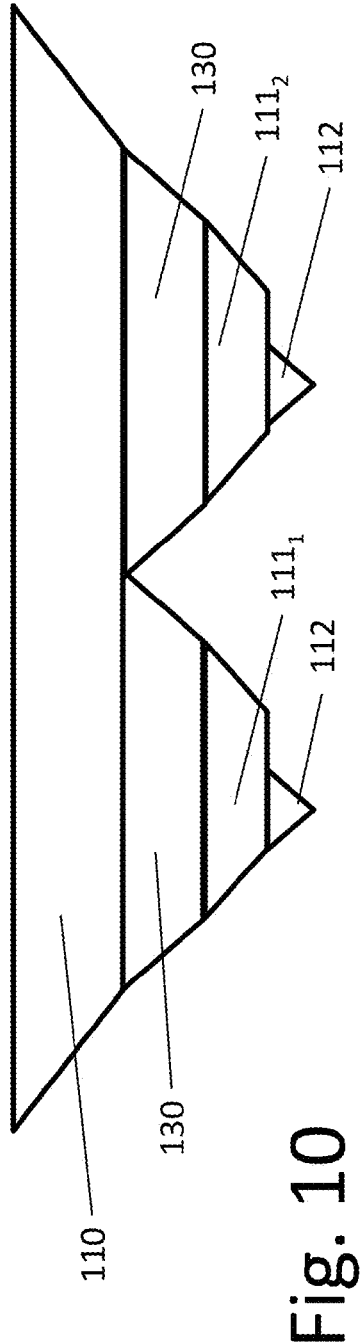
FIG. 10 depicts a segmentation of Complete Verification Set data in an embodiment of an RDA system.
Figure 11:
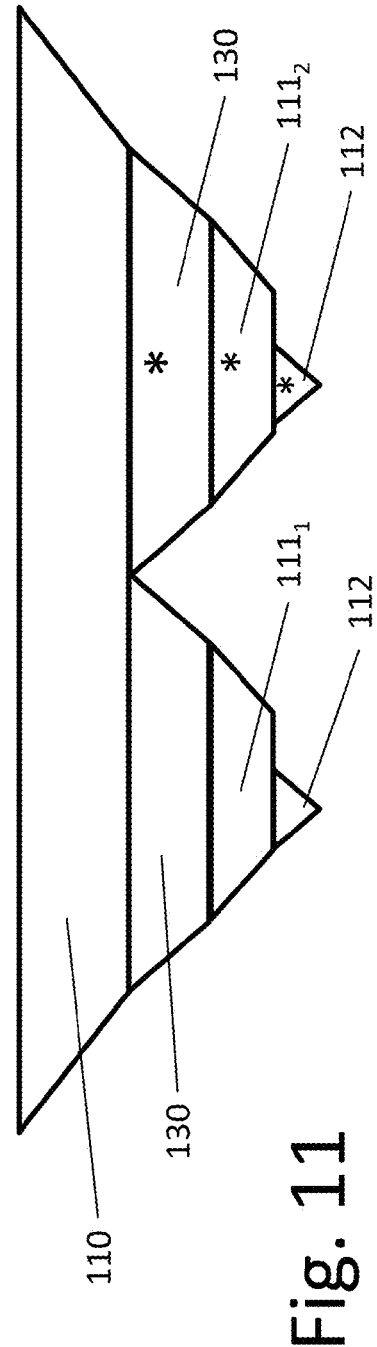
FIG. 11 depicts a segmentation of data and algorithms in an embodiment of an RDA system.

Referring to FIG. 3, once the CVS database is created and collected, it is supplied to a VA 120, which stores it in memory 135. The VA is responsible for: (1) securely storing and managing the CVS; (2) managing requests for LVSs 111; (3) processing CVS data to create LVSs; and (4) distributing LVSs. The VA owner must be able to protect and handle the CVS data at an assurance level at least commensurate with the requirements of the system's most sensitive parts and applications, and typically would be a manufacturer, high-level program entity, or service provider. If a system is intended to manage parts having different security classes (e.g., commercial, government, and classified as shown in FIG. 4A), CVS data preferably may be grouped by reliability, detection, and variability properties, and allocated through the system according to the applicable information assurance requirements and uses of different applications. In such cases, CVS data also can be siloed between multiple VAs having corresponding different levels of security and LVS algorithms 130 as shown by the unmarked, single-asterisked, and double-asterisked siloes in FIG. 5, or a single-VA system could have an architecture that is similarly internally-siloed. Thus, as depicted by the asterisks in FIG. 11, a different security level of algorithm can be used to create LVS $111_2$ than the one used to create LVS $111_1$ (whereas in the non-siloed system shown in FIG. 10 the same security level of algorithms is used to create both LVSs, albeit using different CVS elements). Depending on security requirements, higher-security VAs or internal siloes optionally also (not shown) could receive and process lower-security CVS data; for example, a classified-level VA could handle not just the classified parts of the CVS but also commercial and government parts.

Whether siloed or not, a federation of multiple VAs each limited to a separate subset of CVS data optionally could be employed, possibly communicating CVS-related data among each other with measures to prevent any VA owner from deriving another's CVS data subset. In a federated VA embodiment, for example one VA could store parts' CRPs while another VA stores parts' secret keys. This federated structure could support, for example, a federated identity brokering system such as that disclosed in U.S. Pat. No. 7,581,248 to Atkins et al., the disclosure of which is incorporated herein by reference. Such a combination, with the present RDA system providing the data used to implement authentication, would provide a federated identity structure useable with cloud and other distributed applications that has the added benefit of hardware-based authentication.

Referring to FIG. 2, the VA does not frequently distribute an LVS during the operation phase, but only as a result of need for initial provisioning by a PE 121, request 114 to recover a compromised or lost LVS, or policy-dictated update. The VA derives an LVS's elements from CVS elements that comprise, or more preferably are chosen from, a subset of elements applicable to the recipient PE. The VA should be configured to ensure that each LVS it creates includes representation of CVS elements adequate to: a) redundantly verify all of the parts managed by the recipient PE; and b) satisfy all of the applicable applications, accounting for the degree of usefulness that each type of element has in each application (e.g., SCRM, device management, access management, connectivity management, etc.). The VA retains a record of all LVS data it has distributed (and the CVS elements, algorithms, and parameters used in their creation) and to which PEs, enabling tracing of part-specific CVS elements down to a PE.

Figure 6:
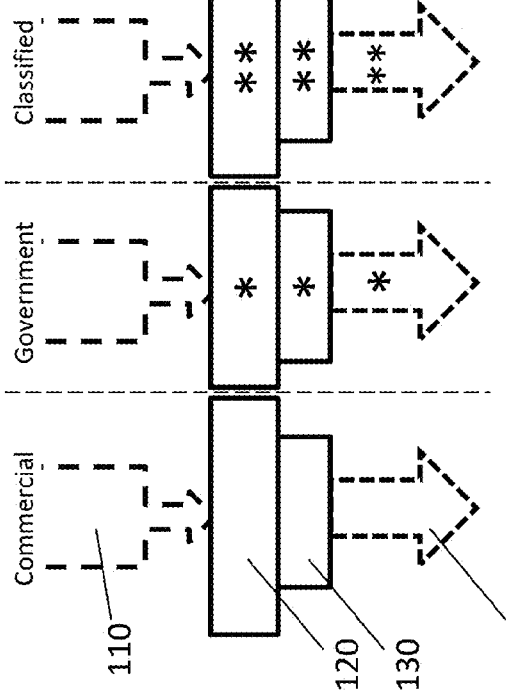
FIG. 6 depicts the top-down data provisioning model of an embodiment of an RDA system.
Figure 7:
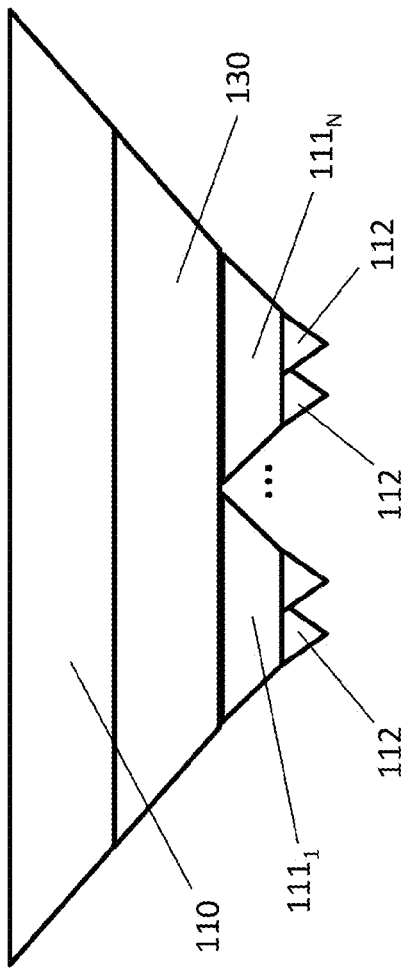
FIG. 7 depicts a specific example of a provisioning in the embodiment of FIG. 6.

Referring to FIGS. 6 & 7, each LVS $111_{1-N}$ is derived from the CVS in a way that produces new (though related) data, utilizing subset CVS data as input parameters in algorithms that include cryptography (e.g., hashing such as with SHA-1 or SHA-2 families), randomness, and/or physical models. One-way algorithms are preferably chosen that preclude reverse construction of CVS elements from any or all distributed LVSs even if the algorithms and parameters that were used to create them are known. Depending on the level of assurance desired for a system, algorithmic complexity (and quality and orthogonality of CVS data) also should be sufficient to make available virtually infinite LVS algorithms (and thus derivable LVSs) or at least preclude the future repeat of any LVS elements and/or parts thereof given the applicable exposure factors such as the system's anticipated service life, the frequency of updates and recoveries, etc. (If less assurance is required and where none of the data at issue is compromised, the VA could be configured to redistribute an LVS lost by a PE).

The LVS is distributed to a PE—typically owned by an application owner or program operator—which securely stores its LVS in a memory 136, and when needed (e.g., upon initial DMS provisioning, DMS-requested recovery, regular update, VA-initiated reprovisioning, etc.), chooses a subset of elements from its LVS adequate to uniquely identify each part managed by a specific DMS 122 in its domain, and preferably without one-way algorithmic transformation, provides the chosen elements to that DMS in the form of an ALVS 112, which the DMS stores in memory 137. The system preferably is configured to preclude (or at least intelligently limit) reuse of LVS elements by a PE, so each PE maintains a record of all ALVSs it has provided (and to which DMSs, enabling tracing down to them).

DMSs may be provided with mutually-exclusive (non-overlapping) ALVS data elements, or the RDA system may be configured so that ALVS data is shared or synchronized (for example the system may be configured so that one DMS would need to re-confirm an attribute that another DMS has already confirmed for its application) among multiple DMSs in a domain, in which case coordination thereof may be managed by the responsible PE. A system may be configured so that all DMSs communicate directly with their PE to obtain all new or updated ALVSs, or configured so that certain ALVS data is obtained via peer-to-peer sharing among DMSs. In the latter case, DMSs could establish trust among each other (and optionally, re-keying could be effected) using the methods taught in Applicant's co-pending application Ser. No. 13/163, 086 (the disclosure of which is incorporated herein by reference), with the DMSs being the nodes and the PE being the central authority. (Such peer-to-peer sharing could also greatly enhance the scalability of a given PE's domain). Each DMS communicates directly with fielded devices, using its ALVS data to perform application-specific security-related functions for various applications such as SCRM, authentication, encryption, etc. A DMS may be confined to an exclusive or an overlapping "enclave" that is limited geographically (e.g., a cellular communications tower and the devices authorized to communicate with it), by application, by program, etc. Each DMS records a log of all of its device interactions, for operational accounting and traceability purposes.

Global, straightforward traceability to trusted hardware-specific security information is enabled through the VA's static CVS data/part bindings in conjunction with the DMSs' and the PEs' records tracking down to specific transactions with individual devices. (Such records also may be required to enable various applications' security-related functions). Since operational data (ALVS/LVS) can be protected with one-way algorithmic obfuscation (and/or encryption), however, such data cannot be tied directly to any useable CVS element without information that only the VA possesses and controls for secure use as needed.

An RDA system may be configured so that DMSs can use the results of authentication checks to authorize, promote, inhibit, or block interactions between specified machines, software modules, hardware modules, systems, and/or users. As one example, a DMS could check the parts in a supply chain each day (e.g., to confirm that they are the same as the day before), and could temporarily shut down or permanently disable part or all of a system if certain types of compromises (e.g., suspected counterfeiting) are detected.

An RDA system also may be configured in which devices communicate with each other using real or virtual routers using a communications protocol (e.g., packetized) that utilizes identification based on each device's hardware part-specific data instead of an IP address or the like. For example, devices could be networked through real routers that communicate with, are operationally configured by, and receive real-time authorized device identifications (and preferably also corresponding permitted communications for each device) from DMSs. Or one or more devices could be programmed (individually, or using distributed computing and/or data) to perform such routing functions virtually. In either case, a graphic user interface may be incorporated into DMSs (and/or at another level) to provide for network management including router configuration, policy administration, etc. The DMS preferably would be configured to disable network communication by any devices that may be affected by compromise, automatically in response to specified device interactions or other indications of compromise.

Top-Level Firewall, Tailored Middle- and Lower-Level Recovery Processes

As discussed above, different types of data sets—CVS, LVS, and ALVS—are used at each vertical level of the system. Whereas the VA is on-demand only, the DMSs (and PEs to the extent a system has synchronized ALVS) control normal operational use of verification data for multiple applications controlled/owned by the system and thus may face greater exposure; it also may be impractical to implement all of the same security measures used by the VA at the levels below. Cementing the distinction between CVS versus LVS/ALVS with the one-way algorithms that are used to derive LVSs from CVS data, however, effectively firewalls the latter from potentially lower assurance levels underneath the VA. (The same distinction also enables security against top-down risk vectors—if the CVS itself were somehow compromised, still the VA would be able to create and distribute new LVSs that are secure in that new algorithms and parameters not known to the VA at the time of compromise would be employed).

The distinction between CVS, LVS, and ALVS likewise enables the tailoring of correspondingly distinct ALVS and LVS recovery processes so as to permit the enforcement of vigilant security policies at the level of use without incurring much (or in some cases, any) system-wide overhead. Since DMSs are at the level of use, they and the elements in their data sets are exposed to the most likely and frequent source of direct compromise in the system (namely, the variety of fielded devices with which the DMSs constantly interact). Correspondingly, the ALVS recovery process preferably is straightforward and has little or no collateral impact on PEs (and their respective DMSs) other than the PE in whose domain the recovering DMS exists, and depending on the embodiment preferably may also have little or no collateral impact on the other DMSs in the same domain. Thus, a DMS that needs a new or updated ALVS $112_{new}$ (due to loss or compromise of the existing ALVS $112_{old}$, and/or DMS-enforced policy) makes a recover request 115 to the PE (or in the case of peer-to-peer DMSs, possibly to one or more peer DMSs) including information regarding any compromise, and the PA just selects a group of previously-unused elements from its LVS and provides it to the DMS (as shown in FIG. 9 versus FIG. 7) and possibly conveys compromise-related information up to the VA. (The VA preferably processes such information and includes it as appropriate in a blacklist 137 of any compromised underlying CVS elements and/or hardware, and depending on the VA's policies and the specific compromise(s) at issue, pushes a new LVS (or LVSs) down, in response to which the affected PE(s) distribute new ALVSs). Only at the middle level (i.e., PE), where recovery should be needed less frequently, is a somewhat more burdensome recovery process used. If a PE no longer has enough useable elements to construct new ALVSs, it makes a recover request to the VA, which creates and provides the PE a new LVS $111_{new}$ to replace the old LVS $111_{old}$ (see FIG. 8), and the PE selects and pushes new ALVSs therefrom to the DMSs in its domain.

Additional Security Measures

Security compromises should not require device-level replacement, because ALVS compromises only affect specific subsets of LVS elements and in any case the CVS is effectively firewalled against LVS data compromises; further, the newly-created information employed in LVS algorithms would ameliorate even the case of direct compromise of a CVS itself. Nevertheless, it may be preferable to layer additional security measures, such as keyed and encrypted communications between all or specified entities, onto the RDA system's inherent security. In the case of communications between DMSs and devices, such additional measures could be enhanced further by sharing with a part a secret value or key that identifies the specific hardware security feature or sub-feature (e.g., the location of PUF sub-circuits) to be used in authenticating that part.

Embodiment Utilizing CRP Data

Figure 12:
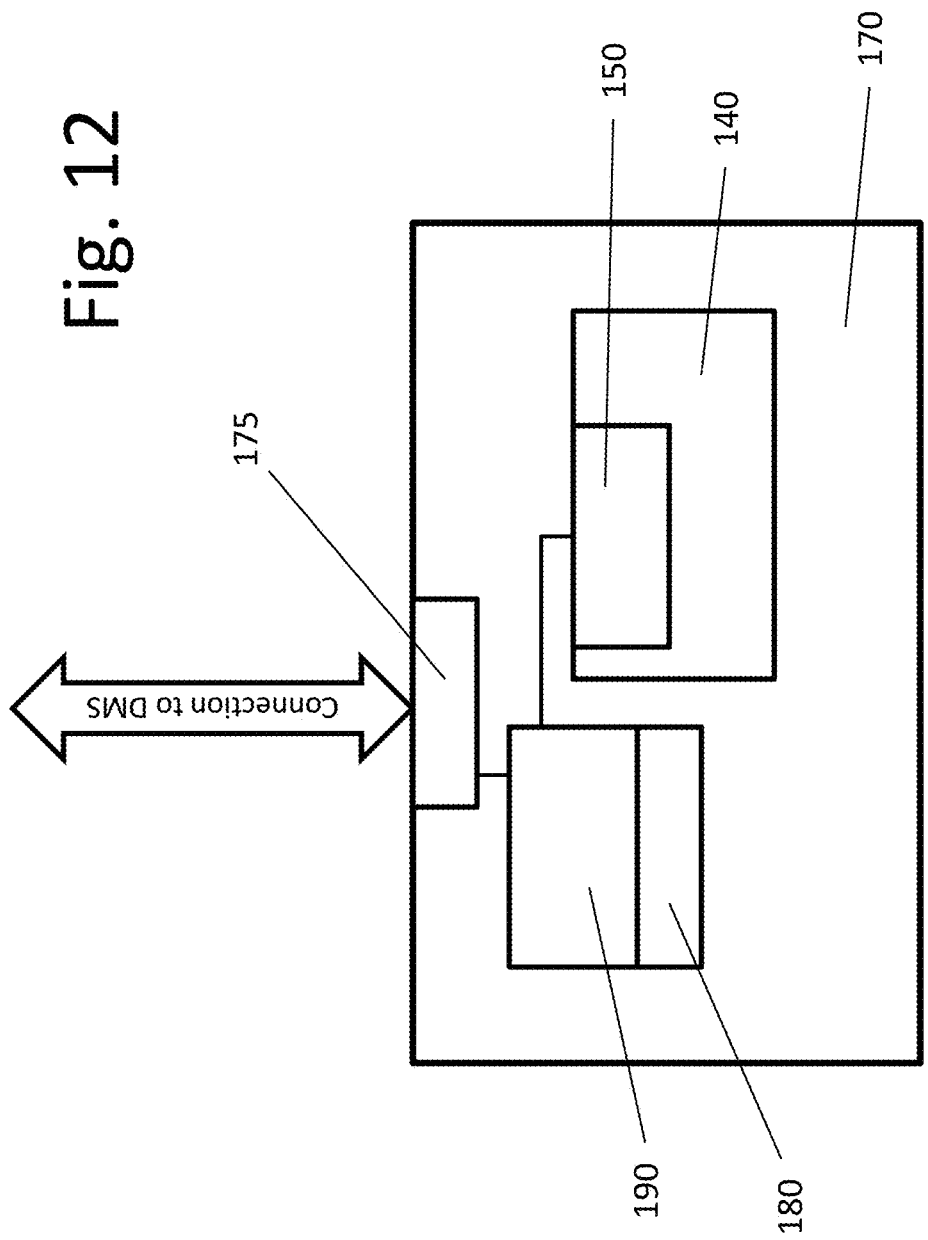
FIG. 12 is a partial circuit diagram of a device that can be used in an embodiment of an RDA system that manages devices with hardware parts having PUFs.
Figure 13:
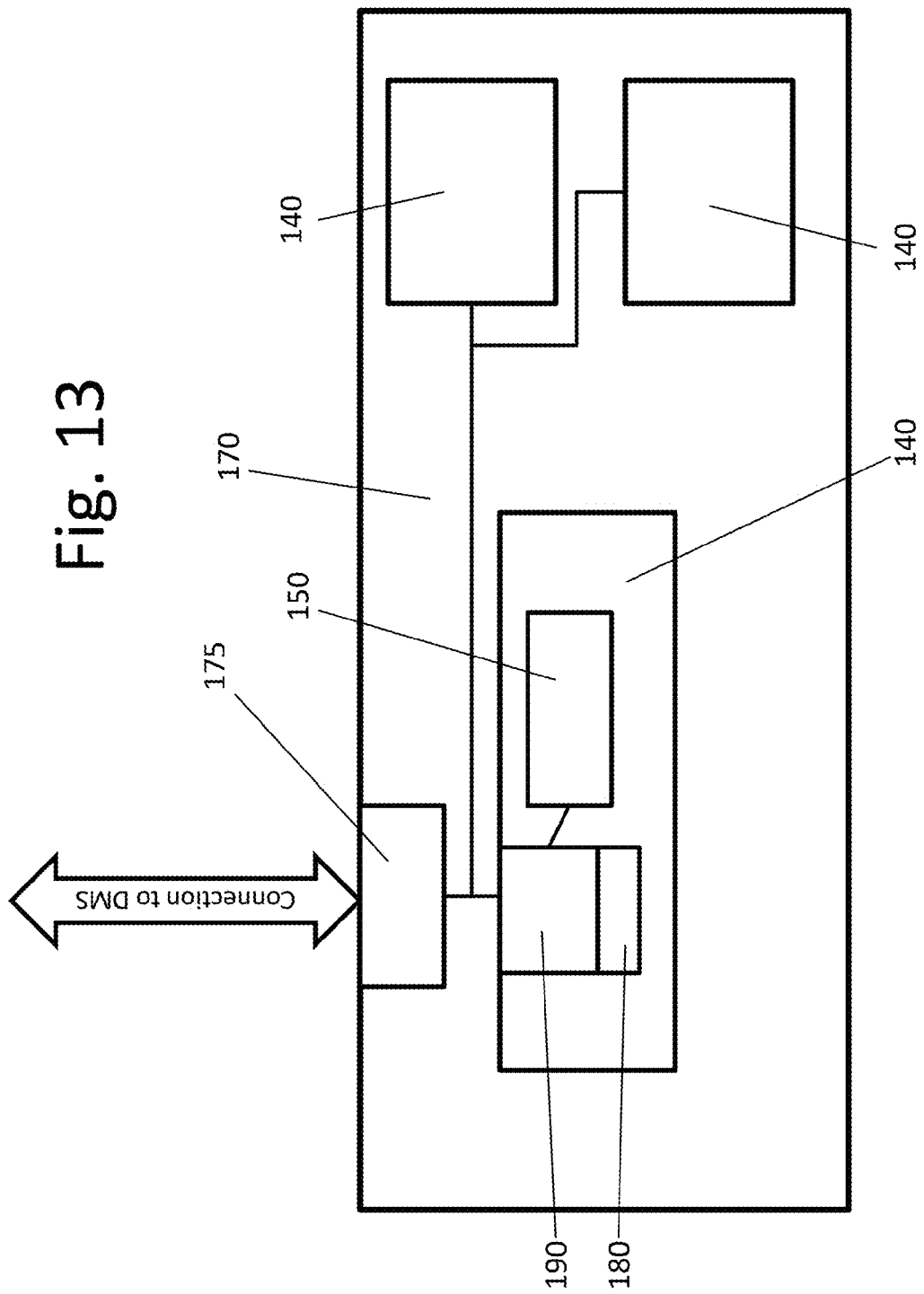
FIG. 13 is a partial circuit diagram of another version of a device like that of FIG. 12.

Referring to FIGS. 12 and 13, an embodiment of an RDA system can manage devices 170 with hardware parts 140 having PUFs 150. PUFs may be characterized through the cataloguing of numerous challenge response pairs ("CRPs") upon manufacture or initial programming of an FPGA. (The validation of such PUFs through the use of CRPs is described in U.S. Pat. No. 7,839,278 to Devedas et al. and U.S. Patent Application Publication Nos. 2011/0066670 to Yu, 2011/0033041 to Yu et al., 2010/0272255 to Devedas et al., and 2010/0127822 to Devedas et al., the disclosures in that regard of which are incorporated herein by reference). This cataloguing produces a table of CRPs for each part, which can then be divided into a plurality of smaller tables each of which is stored (along with a binding to the unique identity of the corresponding part) as an element in the CVS database. The VA can be configured to produce an LVS element from such a CRP-based CVS element by obfuscating the response value of each of the element's pairs one-by-one using a suitable one-way algorithm as discussed above (e.g., hashed with parameters and a key), and re-pairing the resulting obfuscated response value with each corresponding non-obfuscated challenge value. The resulting challenge/obfuscated-response pairs for the element then also could be encrypted using suitable known encryption means, either pair-by-pair (and then reassembled along with the element's binding information) or all together (but preferably before joining the binding information). Alternately the initial complete table of CRPs for a part could be stored (along with a binding to the unique identity of the corresponding part) undivided as a single element in the CVS database, and the VA create an LVS element from it by choosing a number of (preferably not all) CRPs from the element's CRP table, one-way obfuscating the response value of each of the chosen pairs one-by-one, re-pairing each resulting obfuscated response value with the corresponding non-obfuscated challenge value, and if desired encrypting pair-by-pair or element-by-element and then joining the binding information. Prior to the foregoing encryption, challenge values additionally might be individually encrypted with an encryption key that is derived (such as with a hashing algorithm) from a base key known only to the VA and the system's devices (preferably by securely embedding or otherwise providing it in them at the time of their fabrication); such a system then also could be partitioned using different base keys that are specific, e.g., to a particular PE's domain's (or even DMS's enclave's) devices.

The VA joins the LVS elements it creates for the parts in a particular PE's domain to produce an LVS, and provides it (preferably encrypted) to that PE. The recipient PE then can search the LVS's part-identity binding information (which is preferably stored in the elements unencrypted and/or external to the elements themselves, so as to avoid unnecessarily unencrypting all LVS elements), identify the subset of elements that is relevant to a particular DMS, choose some of those elements with which to construct an ALVS, and provide that to the DMS (preferably via a communication that is encrypted). The recipient DMS then (unencrypting the elements if necessary) can utilize the ALVS's relevant elements to manage various applications' security-related functions that comprise or involve interaction with one or more devices 170 (e.g., via an input/output 175 the device is provided with). While the ALVS elements contain useable PUF challenge data, however, the valid response data for the corresponding responses is obfuscated in a manner (i.e., one-way) such that it is unknowable to the DMS. Consequently, the DMS can only verify a device in the field responding to its challenge if the response matches the obfuscated one known to the DMS. This can be accomplished by including in each device 170 (or alternately as shown in FIG. 13, in every part 140) a memory 180 in which is loaded the specific algorithm and parameter information (e.g., specific hash function, and other inputs) that was used by the VA to create the elements pertaining to that device (or part, in the embodiment of FIG. 13) in the responsible PE's current LVS, and a controller 190 capable of performing the same algorithmic transformation (using the information in the memory) on responses generated by the PUF 150.

The algorithm and parameter information stored in each memory 180 preferably may be conveyed there from the VA in a special element, which, upon the issuance or updating of an LVS, the recipient PE distributes to each DMS in its domain, which in turn convey the special elements on to each device they manage. In such case, each LVS is associated with as many special elements as there are devices in the recipient PE's domain, and the special elements preferably are sent alongside the corresponding LVS but not stored in the PE's or DMSs's memories. To minimize the risk associated with the compromise of any given device, the VA preferably employs a different algorithm and/or parameters for each CRP pair, or at least for each CRP-based LVS element, and the corresponding collection of algorithm and parameter information for each LVS element bound to parts in a given device (or in the embodiment of FIG. 13, bound to a given part) is contained in each special element. Each special element preferably may be encrypted with a specific key derived from (e.g., with a hash) a specific individual key known only to the VA and the particular respective device (or part) in which it is embedded or otherwise provided at the time of manufacture. The system in that case also could be configured to allow re-keying of specific keys via communication from the VA to pertinent devices through the PE/DMS without exposing specific key-related information to the PE's and DMS's that can be used by them—for example by the VA transmitting a challenge value (preferably one not included in any LVS) and causing each device (or part) receiving it to transform (e.g., hash) its ensuing response using its individual key, and thenceforth employ the resulting value as its new specific key.

Embodiment Utilizing Hardware Security Modules

Rather than using a one-way algorithmic transformation to protect CVS data from exposure at the PE and DMS levels, an embodiment of an RDA system otherwise as described above could be configured to provide CVS subset data to PEs (and PEs subsets thereof to DMSs) without one-way transformation, but governed by hardware security modules ("HSMs") incorporated into each PE and DMS (and possibly VAs, depending on the architecture). In a PUF-based embodiment utilizing device characterization models for example, the HSMs (e.g., Thales e-Security Inc.'s model nC3023E-500 (nShield F2 PCI Express)) could permit only a selected portion or portions of a given device's characterization model to be useable by PEs and DMSs in which the model is stored. HSMs also could be used as an additional measure to protect one-way transformed LVS and ALVS data.

One skilled in the art will appreciate that other variations, modifications, and applications are also within the scope of the present invention. Thus, the foregoing detailed description is not intended to limit the invention in any way, which is limited only by the following claims and their legal equivalents.

What is claimed is:

1. A method of providing resilient authentication of managed devices, comprising:
   a. establishing one or more verification authorities ("VAs") each having a processor and a VA memory;
   b. loading one or more VA memories with a complete verification set ("loaded CVS") that includes hardware part-specific data associated with one or more managed devices;
   c. creating one or more limited verification sets ("LVSs") from said loaded CVS through one-way algorithmic transformation of hardware part-specific data in said loaded CVS;
   d. establishing one or more provisioning entities ("PEs") each connectable to at least one of said one or more VAs, and each having a processor and a PE memory;
   e. loading each PE memory with a LVS ("loaded LVS");
   f. selecting a subset of data from said loaded LVS so as to create an application limited verification set ("ALVS"); and
   g. creating one or more replacement LVSs from said loaded CVS through one-way algorithmic transformation of hardware part-specific data in said loaded CVS.

2. The method of claim 1, further comprising the steps of connecting a PE to a VA, and conveying a replacement LVS from the VA to the PE.

3. The method of claim 2, further comprising the step of a VA storing a LVS record containing the content of each LVS provided by it to PEs and an identification of the recipient PEs.

4. The method of claim 3, further comprising the step of a VA, in response to an authorized entity's request for tracing, providing part of its LVS record to the authorized entity.

5. The method of claim 1, further comprising the steps of: connecting, to a specified PE, one or more device management systems ("DMSs") each including a DMS memory; and conveying an ALVS from said specified PE to a connected DMS.

6. The method of claim 5, further comprising the step of said connected DMS managing one or more managed devices associated with hardware part-specific data in said loaded CVS.

7. The method of claim 6, further comprising the step of each DMS storing in its DMS memory a record of interactions with managed devices.

8. The method of claim 5, wherein at least one of said one or more DMSs is configured to perform supply chain risk management or to manage device authentication.

9. The method of claim 5, wherein at least one of said one or more DMSs is configured to govern networked communications among managed devices with a communications protocol in which network addresses are based on managed devices' hardware part-specific data.

10. The method of claim 5, further comprising the step of said specified PE storing an ALVS record containing the content of each ALVS provided by it to connected DMSs and an identification of the recipient DMSs.

11. The method of claim 10, further comprising the step of a PE, in response to an authorized entity's request for tracing, providing part of its ALVS record to the authorized entity.

12. The method of claim 5, further comprising the step of a PE constructing a replacement ALVS.

13. The method of claim 12, further comprising the step of a PE excluding, from said replacement ALVS, data that was included in a loaded ALVS.

14. The method of claim 13, further comprising the step of the PE constructing said replacement ALVS without employing a one-way algorithmic transformation.

15. The method of claim 1, wherein the one-way transformation of step g is different than the one-way transformation of step c.

16. The method of claim 1, wherein one or more of the managed devices includes a physically-unclonable function ("PUF").

17. The method of claim 5, wherein one or more of the managed devices includes a physically-unclonable function ("PUF").

18. The method of claim 1, further comprising the steps of a PE conveying information regarding any device-level security compromise to a connected VA, and that VA creating or updating a blacklist of CVS elements.

19. A resilient device authentication system for use with one or more managed devices each having hardware part-specific information, comprising:
   a. one or more verification authorities ("VAs") including a VA memory loaded with a complete verification set ("loaded CVS") that includes hardware part-specific data associated with corresponding hardware part-specific information of the one or more managed devices, said VA configured to create a data set from a subset of said loaded CVS;
   b. one or more provisioning entities ("PEs") each connectable to at least one of said one or more VAs, each including a PE memory loaded with said data set created by said VA and a hardware security module, and each configured to create a DMS data set from a subset of said data set created by said VA; and
   c. one or more device management systems ("DMSs") each including a memory loaded with a DMS data set and a hardware security module,
   wherein said hardware security modules in said PEs and DMSs are configured to permit only a selected portion or portions of hardware part-specific CVS data to be useable by the PEs and DMSs in which that hardware part-specific CVS data is stored.

20. The system of claim 19, wherein at least one VA is configured to create a data set from a subset of said loaded CVS without performing one-way algorithmic transformation of hardware part-specific data in said loaded CVS.

21. The system of claim 20, wherein said VA is configured to create a replacement data set from a subset of said loaded CVS.

22. The system of claim 20, wherein at least one PE is configured to create a replacement DMS data set.

23. The system of claim 19, wherein at least one VA is configured to perform one-way algorithmic transformation of hardware part-specific data in said loaded CVS, and wherein said data set created from a subset of said loaded CVS by said VA is a limited verification set ("LVS").

24. The system of claim 23, wherein at least one PE is configured to create a replacement DMS data set.

25. The system of claim 23, wherein said VA is configured to create a replacement LVS.

26. The system of claim 19, wherein each VA is configured to store in its VA memory a record of data conveyed by it to a PE.

27. The system of claim 26, wherein each VA is configured to, in response to an authorized entity's request for tracing, provide one or more records to the authorized entity.

28. The system of claim 19, wherein each DMS is configured to manage supply chain risk management, device authentication, or the governing of networked communications among managed devices.

29. The system of claim 28, wherein each DMS is configured to store in its DMS memory a record of device interactions.

30. The system of claim 20, wherein the hardware part-specific data characterizes one or more physically-unclonable functions residing in the managed devices.

31. The system of claim 23, wherein the hardware part-specific data characterizes one or more physically-unclonable functions residing in the managed devices.

32. A resilient device authentication system for use with one or more managed devices each including hardware part-specific information, comprising:
   a. one or more verification authorities ("VAs") including a processor and a VA memory loaded with a complete verification set of data ("loaded CVS") that includes means for uniquely identifying each of the one or more managed devices, each VA configured to create a limited verification set ("LVS") from said loaded CVS and configured to create a replacement LVS from said loaded CVS; and
   b. one or more provisioning entities ("PEs") each connectable to at least one of said one or more VAs, including a processor and a PE memory loaded with a LVS ("loaded LVS"), each PE configured to select a subset of said loaded LVS loaded to create an application limited verification set ("ALVS") and configured to create a replacement ALVS from said loaded LVS.

33. The system of claim 32, wherein said VA is configured to create said LVS through a one-way algorithmic transformation of data in said CVS.

34. The system of claim 32, further comprising one or more hardware security modules employed to protect CVS data from exposure.

35. The system of claim 32, wherein the means for uniquely identifying each of the one or more managed devices comprises data associated with physical unclonable functions in one or more managed devices.

36. The system of claim 32, further comprising one or more device management system means for managing the one or more managed devices.

* * * * *